(12) United States Patent
Nitschke et al.

(10) Patent No.: US 7,159,899 B2
(45) Date of Patent: Jan. 9, 2007

(54) DEVICE FOR ACTUATING RESTRAINT MEANS IN A MOTOR VEHICLE

(75) Inventors: Werner Nitschke, Ditzingen (DE); Heiko Buehring, Oldenburg (DE); Heiko Fricke, Remshalden (DE); Jorge Sanchez Arriazu, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 10/738,866

(22) Filed: Dec. 16, 2003

(65) Prior Publication Data

US 2004/0195032 A1 Oct. 7, 2004

(30) Foreign Application Priority Data

Dec. 17, 2002 (DE) ............................. 102 58 837

(51) Int. Cl.
*B60R 21/16* (2006.01)
(52) U.S. Cl. .................... 280/735; 342/72; 701/45
(58) Field of Classification Search ............... 280/735, 280/801.1, 808; 180/271, 282; 307/9.1, 307/10.1; 340/435–436, 10.1; 701/45–47; 342/72
See application file for complete search history.

(56) References Cited

U.S. PATENT DOCUMENTS

| | | | | |
|---|---|---|---|---|
| 5,964,816 A * | 10/1999 | Kincaid | ........................ | 701/45 |
| 5,967,549 A * | 10/1999 | Allen et al. | .................. | 280/735 |
| 6,236,920 B1 * | 5/2001 | Hora | ............................ | 701/45 |
| 6,255,790 B1 * | 7/2001 | Popp et al. | .................. | 318/280 |
| 6,295,494 B1 * | 9/2001 | Nitschke et al. | ............... | 701/45 |
| 6,302,439 B1 * | 10/2001 | McCurdy | ..................... | 280/735 |
| 6,565,119 B1 * | 5/2003 | Fogle, Jr. | .................... | 280/735 |
| 6,950,031 B1 * | 9/2005 | Selig et al. | ................. | 340/666 |
| 6,960,993 B1 * | 11/2005 | Mattes et al. | ................ | 340/438 |
| 2002/0074860 A1 * | 6/2002 | Bauer et al. | ................ | 307/10.1 |
| 2004/0199701 A1 * | 10/2004 | Eckmuller | .................... | 710/305 |

FOREIGN PATENT DOCUMENTS

| | | |
|---|---|---|
| DE | 101 14 020 | 8/1957 |
| DE | 197 43 313 | 12/1998 |
| DE | 197 45 652 | 7/2001 |
| DE | 101 06173 | 9/2002 |
| DE | 101 25 826 | 11/2002 |
| DE | 101 42 409 | 3/2003 |
| DE | 101 26 191 | 1/2004 |
| DE | 10 102 994 | 2/2004 |

\* cited by examiner

*Primary Examiner*—David R. Dunn
*Assistant Examiner*—Drew J. Brown
(74) *Attorney, Agent, or Firm*—Kenyon & Kenyon LLP

(57) ABSTRACT

A possibility for controlling and supplying energy to a larger number of restraint means components in a vehicle seat that can be installed in variable fashion, this possibility being able to be realized using a constructively simple and robust electrical connection, so that this connection in particular also withstands the mechanical stresses that occur during the installation and removal of the vehicle seat. For this purpose, the vehicle seat is equipped with at least one system bus for controlling and supplying energy to the individual restraint means components of the vehicle seat. In addition, means are provided for the electrical contacting of the system bus during the installation of the vehicle seat.

11 Claims, 2 Drawing Sheets

DEVICE FOR ACTUATING RESTRAINT MEANS IN A MOTOR VEHICLE

FIELD OF THE INVENTION

The present invention relates to a device for actuating restraint means in a motor vehicle, the restraint means being built into a vehicle seat that can be installed in variable fashion in the passenger compartment (interior) of the vehicle.

BACKGROUND INFORMATION

In many types of vehicle, the seats can be situated in greatly varying fashion in the passenger compartment, depending on how many persons are to be transported, or how much stowage space is required. In this way, the vehicle can be used both as a passenger vehicle and for transporting cargo, depending on the situation. Here, the different seat configurations are not only determined by the installation and removal of the vehicle seats to and from positions that are predetermined for the respective seat; rather, in many vehicle types known from practical use the individual seats can also be mounted at various positions in the passenger compartment and then additionally moved parallel to the longitudinal axis of the vehicle. It is often also possible to freely select the orientation of a vehicle seat in, or opposite, the direction of travel, either through corresponding mounting or by rotating the mounted seat.

In order to improve the protection of the vehicle occupants, seats of this type that can be installed variably in the passenger compartment are also to be equipped with restraint means, such as e.g. shoulder and lap safety belts, lateral thoracic protection, etc. This proves to be problematic in particular given a larger number of components of the restraint means. As a rule, motor vehicles are equipped with a central control device that carries out the overall coordination of the controlling and actuation of restraint means in the motor vehicle. In a conventional wiring of the restraint means of a vehicle seat, the associated actuating (ignition) circuits and firing actuators are connected to the central control device when the seat is installed in the passenger compartment. The electrical contacting takes place via a relatively complicated plug connection, having a large number—depending on the number of restraint means components that are to be contacted—of plug pins. As a rule, such plug connections are not sufficiently robust to withstand the mechanical stresses caused by the repeated installation and removal of the seat, and the unavoidable introduction of dirt that occurs during these operations. Additional mechanical stresses can occur for example due to the entry of foreign objects, or during the cleaning of the plug connection parts.

SUMMARY OF THE INVENTION

The present invention provides a possibility for controlling, and supplying energy to, a larger number of restraint means components in a vehicle seat that can be installed in variable fashion, which possibility can be realized using a constructively simple and robust electrical connection, so that this connection in particular can also withstand the mechanical stresses that occur during the installation and removal of the seat.

According to the present invention, the seat is equipped with at least one system bus for controlling and supplying energy to the individual restraint means components of the seat. Moreover, means are provided for the electrical contacting of the system bus during the installation of the seat.

Thus, according to the present invention, the individual restraint means components of a seat are connected to a system bus that is built into the seat. For controlling, and also for supplying energy to, the individual restraint means components, it is then necessary to create only one electrical connection with the system bus during the installation of the seat. This not only essentially simplifies the electrical contacting of the individual restraint means components during the installation of the seat; in addition, the seat can be equipped with a certain degree of "intelligence" that can be used advantageously in particular in the controlling of the individual restraint means components. In connection with advantageous constructions of the present invention, various possibilities for an intelligent control system are explained in more detail below.

In principle, various types of system bus are possible for the realization-of the device according to the present invention. Particularly suitable is a system bus developed by the firms Bosch, Siemens, and Temik, known under the designation BST-Rückhaltesystembus (BST Restraint System Bus). This system bus can be electrically contacted in simple fashion via a 2-wire interface or a 3-wire interface. Alternatively, the system bus used in the context of the device according to the present invention can also be equipped with a contactless interface, so that the signal and energy transmission takes place inductively and/or capacitively. Such interfaces can not only be realized in mechanically robust fashion; they are also advantageous because, without the use of additional sensors, they enable a simple and reliable recognition of the direction of installation of the seat through the evaluation of the polarity of the electrical connection, or the phase position in the case of an inductive coupling.

As was already mentioned, there are various possibilities for the realization of the device according to the present invention, and in particular for the choice or design of the system bus. The functionality of the system bus is usefully matched to the functionality of other vehicle modules, such as for example the functionality of a central control device that coordinates the overall controlling and actuation of the restraint means in the motor vehicle, or the functionality of a driver information system. In this connection, it proves to be particularly advantageous if the system bus is designed for a bidirectional communication. The system bus is then capable not only of receiving control signals and forwarding them to the individual restraint means components; rather, in this case items of information can also be retrieved by the system bus, and can for example be forwarded to the central control device or to a driver information system.

In particular if the system bus is designed for a bidirectional communication, it proves to be advantageous if the system bus also comprises storage means. These can be read-only memories (ROM) on which fixed state data are stored, such as for example information concerning the vehicle seat module, in particular whether it is a one-person seat, two-person seat, or three-person seat, and concerning the configuration of the restraint means of the vehicle seat module. However, the storage means can also include rewritable memories (RAM) whose content can be updated. Here, for example it is possible to store the currently determined installation position and/or direction of installation of the seat, or also its installation state, in particular whether the vehicle seat is folded up or whether the seat back is folded down.

Here it is also to be noted that the vehicle seat can also be equipped with a sensor system, for example for vehicle occupant classification. Such a sensor system is also advantageously connected to the system bus, so that the central control device can access the information obtained in this way.

DETAILED DESCRIPTION

Figure 1:
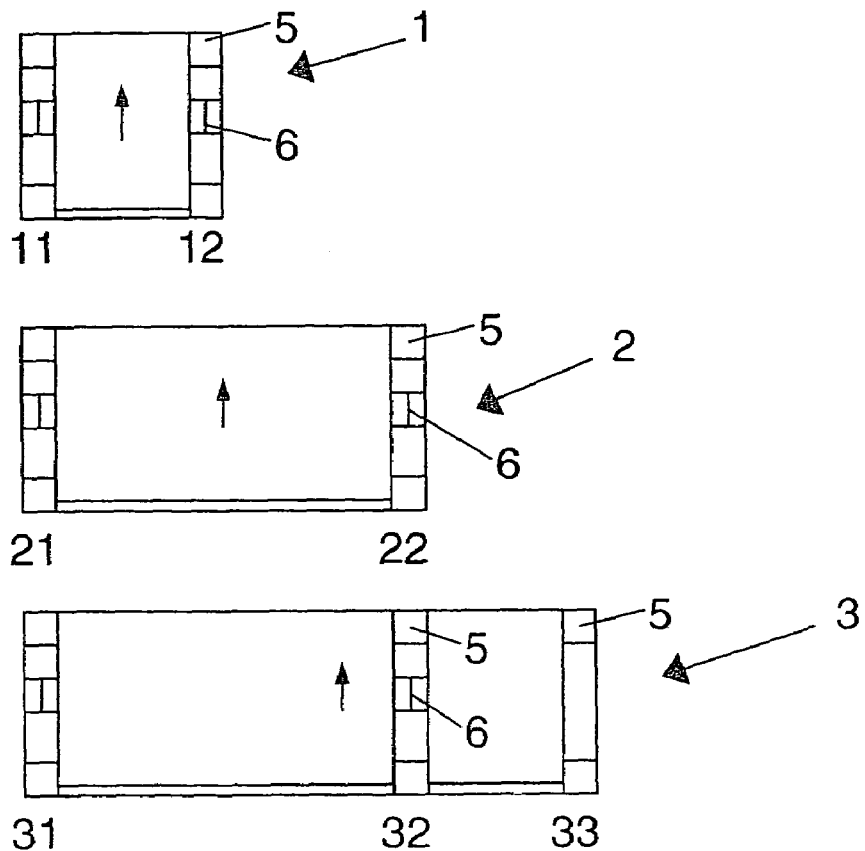
FIG. 1 shows the fastening frames, connected to the seat, of three different vehicle seat modules.
Figure 2:
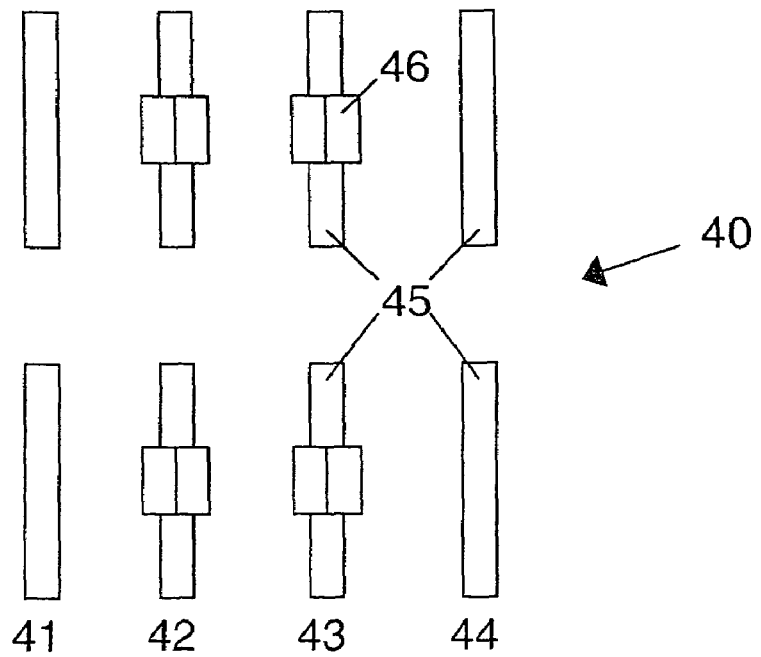
FIG. 2 shows a corresponding rail system connected to the vehicle, in a schematic representation.

In FIG. 1, the fastening frames connected to the seat of a one-person seat 1, a two-person seat 2, and a three-person seat 3 are shown. The seat direction is indicated in each case by an arrow that is drawn in at the center. The fastening frames of one-person seat 1 and of two-person seat 2 each have two laterally situated fastening rails 11 and 12, or 21 and 22, of identical design. At both ends of these fastening rails 11, 12; 21, 22, fastening claws 5 are situated with which the respective seat can be fixed to corresponding mating locations in the passenger compartment. This can be for example a rail system connected to the vehicle, as shown in FIG. 2. Centrally situated in each case is a contacting 6 for a system bus built into the seat, to which bus all restraint means components of the seat, and, if warranted, also a sensor system, are connected. In the exemplary embodiment shown here, the contacting takes place via a 2-wire interface of the system bus. Differing from that of one-person seat 1 and two-person seat 2, the fastening frame of three-person seat 3 has three fastening rails 31, 32, and 33, which are all likewise equipped with fastening claws 5, of which however only the center one 32 is provided with a contacting 6.

As mentioned above, seat modules equipped with the fastening frames shown in FIG. 1 can be mounted in the passenger compartment via a rail system 40, as shown in FIG. 2. Rail system 40 has four bearer rails 41, 42, 43, 44 that are situated parallel to one another and with equal spacing from one another. At the potential installation locations of the seat modules there are located what are known as boats (shuttles) 45, which have mechanical accepting devices (here not shown in more detail) for fastening claws 5 of the seat modules. Moreover, boats 45 of the two center bearer rails 42 and 43 each have a centrally situated contacting point 46 for a contacting 6 of a seat module. Because the two center bearer rails 42 and 43 come into use in any case in the assembly of all three seat types, independent of the position at which the respective seat module is installed, only these two bearer rails 42, 43 need be equipped with contacting points 46 in order to ensure the functionality of the restraint means of the seat module. Since the two outer bearer rails 41 and 44 have no influence on the functionality of the restraint means, they can also be formed arbitrarily long, and can be formed for the fixing of other transported goods. The assembly design described here proves to be advantageous in particular in commercial vehicles in which there is additional stowage room behind the rows of seats.

The fastening frames at the seats, described above, and the rail system designed for them, connected to the vehicle, enable not only a fixing of different vehicle seat modules in the passenger compartment and a simple contacting of the restraint means built into these seat modules; rather, via the contacting it is also possible to carry out a simple but reliable seat installation recognition, because only correctly installed seat modules can be contacted, and the installation position is easily determined via the contacting points. At positions at which no vehicle seat module is mounted, the contacting point is automatically mechanically isolated, and is thus protected against the penetration of foreign objects and liquids. This isolation is mechanically removed only when a vehicle seat module is correctly installed. In this way, for example a seat that is folded down to form a table is recognized as "not installed," so that the restraint means that are built in there are not actuated even in the case of a crash.

For the recognition of the direction of the seat installation, the polarity of the contacting, or the phase position in the case of inductive coupling, is evaluated. If the vehicle seat module is installed in the direction of travel, the left contact of contactings 6 connected to the seat is connected with the left contact of contacting points 46 of rail system 40, and the right contact of contacting 6 connected to the seat is connected with the right contact of contacting point 46 of the rail system. These relations are exactly the reverse in the case of a vehicle seat module installed opposite the direction of travel. Here, the left contact of contactings 6 connected to the seat is connected with the right contact of contacting points 46 of rail system 40, while the right contact of contacting 6 connected to the seat is connected with the left contact of contacting point 46 of rail system 40.

Figure 3:
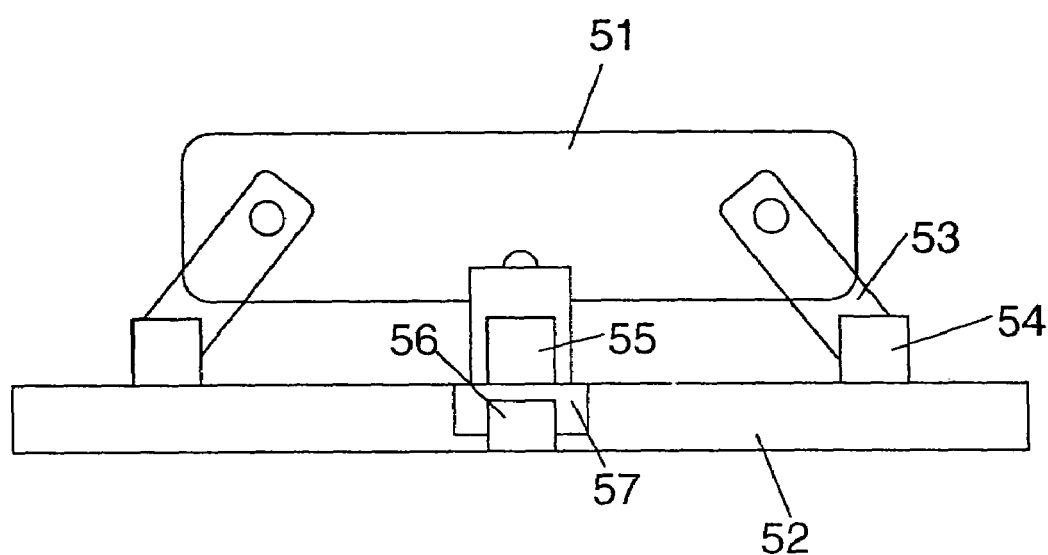
FIG. 3 shows the realization of an inductive coupling of the system bus of a device according to the present invention.

FIG. 3 illustrates the above-described assembly design for the case of an inductive coupling of the system bus built into the vehicle seat. For this purpose, here the side view of the coupling point between a fastening rail 51 of the installed vehicle seat and a boat 52 of a bearer rail connected to the vehicle is shown. The mechanical connection is created with the aid of the two fastening claws 53, which are coupled to the two ends of fastening rail 51 and which work together with the two accepting devices 54, provided for this purpose, of boat 52. The contacting at the seat and the contacting point at the vehicle are centrally situated opposite one another, and each has a magnetic transformer 55 and 56, each provided with a magnetically conductive protective layer 57. In this way, a sufficiently good magnetic coupling arises only when the vehicle seat is correctly installed.

What is claimed is:

1. An actuating device for actuating at least one restraint device in a motor vehicle, the restraint device being built into a seat of the vehicle that is variably installable in a passenger compartment of the vehicle, the actuating device comprising:

at least one system bus situated in the vehicle seat for controlling and supplying energy to individual components of the restraint device of the vehicle seat; and means for electrically contacting the system bus during an installation of the vehicle seat, wherein at least one of an installation position and a direction of installation of the vehicle seat is detectable with the aid of the system bus, and wherein the direction of installation of the vehicle seat is capable of being determined on the basis of a polarity of the contacting of the system bus.

2. The device according to claim 1, wherein the system bus includes a 2-wire interface for the electrical contacting.

3. The device according to claim 1, wherein the system bus includes a 3-wire interface for the electrical contacting.

4. The device according to claim 1, wherein the system bus includes a contactless interface so that a signal transmission and energy transmission take place at least one of inductively and capacitively.

5. The device according to claim 1, wherein the vehicle is equipped with a central control device that carries out an overall coordination of a controlling and an actuation of the restraint device in the vehicle, the system bus being adapted for a bidirectional communication with the central control device.

6. The device according to claim 1, wherein the vehicle is equipped with a driver information system, the system bus being adapted for a bidirectional communication with the driver information system.

7. The device according to claim 1, wherein the system bus includes a storage device.

8. The device according to claim 7, wherein the storage device includes information items relating to the vehicle seat and relating to a configuration of the restraint device.

9. The device according to claim 1, wherein a state of installation of the seat is identifiable with the aid of the system bus.

10. The device according to claim 9, wherein the state of installation of the seat includes whether the seat is folded up or a seat back of the seat is folded down.

11. An actuating device for actuating at least one restraint device in a motor vehicle, the restraint device being built into a seat of the vehicle that is variably installable in a passenger compartment of the vehicle, the actuating device comprising:

at least one system bus situated in the vehicle seat for controlling and supplying energy to individual components of the restraint device of the vehicle seat; and means for electrically contacting the system bus during an installation of the vehicle seat, wherein the system bus includes a storage device, wherein the storage device includes information items relating to the vehicle seat and relating to a configuration of the restraint device, and wherein the information items relating to the vehicle seat include whether a vehicle seat type is a one-person seat, a two-person seat, or a three-person seat.

* * * * *